Figure 1:
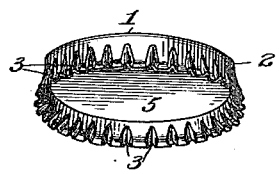

H. COALE.
CLOSURE.
APPLICATION FILED MAR. 29, 1910.

989,336.

Patented Apr. 11, 1911.

Witnesses:
A. M. Houghton
S. T. Caffrey

Inventor:
Harvey Coale
by his Atty's
Philipp, Sawyer, Rice & Kennedy

UNITED STATES PATENT OFFICE.

HARVEY COALE, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

CLOSURE.

989,336.  Specification of Letters Patent. Patented Apr. 11, 1911.

Application filed March 29, 1910. Serial No. 552,149.

*To all whom it may concern:*

Be it known that I, HARVEY COALE, a citizen of the United States, residing at Baltimore city, State of Maryland, have invented certain new and useful Improvements in Closures, fully described and represented in the following specification and the accompanying drawings, forming a part of the same.
This invention relates to certain improvements in closures for food containing receptacles.

In packaging foods of different kinds and particularly milk, it is customary to subject it to heat for the purpose of destroying harmful bacteria. In the ordinary process, the milk is subjected to heat in a suitable receptacle, the temperature to which milk is raised being about 160° F., if it is not desired to break up the fatty globules in the milk which will prevent the rising of the cream. The bottles or jars which are to receive the milk thus heated are sterilized in hot water or steam and the milk is then placed in them. The bottles or jars are then usually sealed by placing upon the mouths a paper disk which may be secured in place, if desired, this being sometimes done by covering it, for instance, with a foil capsule. This practice is objectionable, for the reason that the milk is liable to take up harmful bacteria from the air while being transferred from the heating receptacle to the bottles or jars, and for the further reason that the receptacles must be again handled to place the paper disks thereon after the milk has been poured into them. Further, the milk in the bottles or jars is not maintained *in vacuo*, so that the liability of contamination is increased, particularly where, as is usually the case, the milk is not raised during the processing to much above 160° F.

Other food products, such, for instance, as fruits or vegetables, which it is desired to process or heat and to maintain *in vacuo* after processing, have been processed in the jars or other receptacles which are to contain them, the jars being placed in a vacuumizing receptacle and the covers either being placed loosely on the jars and forced into place after the processing, and while the jars are still in the vacuumizing receptacle, or the covers have been held above the jars by suitable devices, so that they could be forced upon the jars while they were still in the vacuumizing receptacle, the result being that the contents of the receptacles were maintained substantially *in vacuo* after the processing operation was completed. This practice requires more or less complicated mechanism for its operation and is not, for that and other reasons, adapted for use where milk or similar products are to be packaged. It has also been proposed to provide jars or similar receptacles with specially made covers, usually of glass, the covers embodying in their construction spring clips or similar devices by which the covers are held in place. In processing receptacles having such covers, they are, after the contents have been placed therein, subjected to heat, the heat developed within the receptacles during the processing operation, and the consequent expansion of the contents, causing the covers to be forced up against the tension of their spring holding devices, thus permitting the air within the receptacles to escape. As the receptacles cool, the springs force the covers down on the mouths of the receptacles, thus closing them against the admission of air and maintaining the contents substantially *in vacuo*. Covers of the character referred to, as heretofore made, have been expensive and, for this and other reasons, are not adapted for use in connection with the processing of milk or similar products, especially where it is desirable that the cover, for sanitary reasons, be thrown away.

It is the object of this invention to produce an improved closure for receptacles adapted to contain milk or other food products which are to be heated to destroy harmful bacteria and maintained *in vacuo* after heating, which is so cheap in construction that it may be thrown away after a single use, which can be readily and easily locked in place on the receptacle prior to the heating process, which permits the escape of the air from the products during the heating operation, which automatically operates to re-seal the receptacle to which it is applied, and which not only maintains the seal but also protects the mouth of the receptacle from germs during the transportation and subsequent handling of the receptacle.

With this and other objects not specifically referred to in view, the invention consists in the improved construction of closure hereinafter described and specifically pointed out.

Figure 2:
Figure 3:
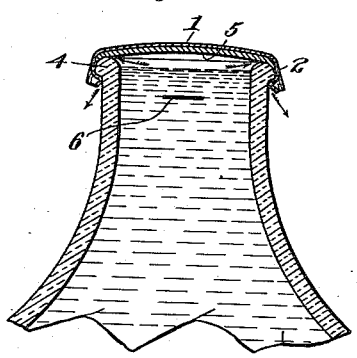
Figure 4:
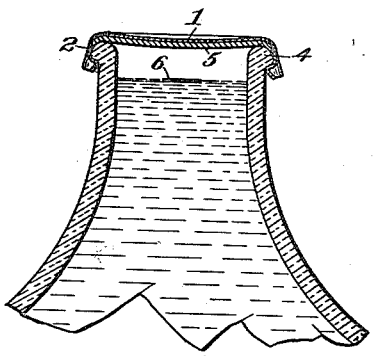

Referring to the accompanying drawings, Figure 1 illustrates one form of cap embodying the invention. Fig. 2 illustrates in perspective the sealing disk employed. Fig. 3 is a sectional view of the cap illustrated in Fig. 1 applied to a receptacle, such as a milk bottle, the section being assumed to be taken during the heating operation. Fig. 4 is a section similar to Fig. 1, the section being assumed to be taken after the heating operation is completed and the receptacle cooled.

Closures embodying the invention will be made of sheet metal and will consist of a top, as 1, and a depending skirt, as 2, integral with the top, the construction being such that the closures may be readily stamped from sheet metal, such as sheet tin, in the ordinary way, thereby insuring cheapness in manufacture.

In the particular construction of closure selected for the purpose of illustrating the invention, the skirt is provided with corrugations 3 which are adapted when the closure is placed upon a receptacle having a suitably formed shoulder, as 4, to be bent into locking engagement with the shoulder, thereby securing the closure firmly in place on the receptacle.

The closure will be provided with a sealing disk or gasket, as 5, which will be formed of comparatively non-elastic material. A sealing disk formed of compressed fibrous material, such as paper, and coated with paraffin has been determined in practice to be well adapted for the purpose of the invention.

The sheet metal from which the cap is formed will be so thin and elastic as to render the cap inherently flexible, thereby permitting it to yield under the pressures developed during the heating operation, so that the air contained in the receptacle may escape therefrom during such operation. It has been found in practice that sheet tin of the character ordinarily known in the market as "taggers tin" which has a thickness of about .0075 in. is well adapted to the construction of the closure.

In using the closure, the receptacle to which it is applied will ordinarily have a gage mark, as 6, placed thereon. The position of this gage mark when employed should be so related to the top of the receptacle, and to the increase in volume of the contents of the receptacle under the heat employed, that when the contents have been heated to the temperature desired, the receptacle will be entirely filled thereby and all the air expelled. By employing this gage mark all the air may be expelled and waste of the contents during the heating may be avoided.

Assuming that a receptacle has been filled up to this gage mark and that a closure has been placed thereon and locked in position and the receptacle has been subjected to heat, the contents will begin to expand. As the pressure in the receptacle increases due to the increase in temperature and the consequent expansion in volume of the contents, the closure will yield slightly, thus permitting the air within the receptacle to escape in the manner indicated by the arrows in Fig. 3. When large closures are employed, such, for instance, as those of a size to close the mouth of ordinary milk bottles, it has been found in practical operation that the top of the cap, during the heating, becomes slightly convex or bulged, as indicated in Fig. 3. When, however, the heating operation is completed and the contents cooled, it has been found that the top of the closure becomes slightly concave, as indicated in Fig. 4. With closures of smaller size, however, the variations in form referred to, of the top of the closure, are not noticeable, but in any case it will be found that after cooling a substantial vacuum exists between the under side of the cap and the level of the contents in the receptacle. In locking the cap in place on the receptacle, the inner corrugations are forced into close contact with the shoulder on the receptacle but the outer corrugations stand away from the shoulder somewhat. The cap is thus locked to the receptacle at separated points, this affording spaces between these locking points which facilitate the ready escape of the air or gases from the receptacle.

The closure which has been described resembles in configuration the well-known "crown cork." A distinguishing characteristic which it possesses and which is not found in the crown cork, however, is the inherent flexibility referred to which permits the cap to yield sufficiently to allow the escape of air and gases from the receptacle under the heat employed. The crown cork is largely employed for sealing beer bottles which are processed under heat in water tanks, and if the bottles are properly sealed there is no escape of air or gas from the bottles, although considerable internal pressure is developed. With the improved cap, however, there is a free escape of air from the receptacles while being heated. Receptacles sealed with the improved closure and containing milk have been subjected to heat in a water tank, the water being gradually raised from a temperature of about 45° F. to about 160° F., and the escape of air from the receptacles begins to take place a considerable time before the higher temperature is reached.

The improved closure may also be used to advantage with containers filled with milk or similar liquids which are liable to be frozen, as the expansion which takes place during freezing is not liable to displace the closure.

While a closure of the character described has been determined in practice to be well adapted for the purposes set forth, the invention may be embodied in closures differing therefrom in construction. The claimed invention is not, therefore, to be limited to the specific construction hereinbefore described and illustrated in the accompanying drawings.

What is claimed is:—

1. A closure for receptacles intended to receive food to be heated while in the receptacles to destroy harmful bacteria, said closure comprising a top and an integral skirt formed from thin sheet metal, said closure being adapted to inclose the mouth of the receptacle and to be bent into engagement with a shoulder thereon, the closure being sufficiently flexible inherently to yield, after it is locked in place, under the pressure developed by the heating to permit the escape of air and to resume its locking position after the pressure in the receptacle is reduced, and being provided with a comparatively non-elastic sealing gasket located in the top of the closure so that when the closure is in place it forms a seal on the top of the mouth of the receptacle.

2. A closure for receptacles intended to receive food to be heated while in the receptacles to destroy harmful bacteria, said closure comprising a top and an integral skirt formed from thin sheet metal, said closure being adapted to inclose the mouth of the receptacle and to be bent into engagement with a shoulder thereon at separated points, the closure being sufficiently flexible inherently to yield, after it is locked in place, under the pressure developed by the heating to permit the escape of air and to resume its locking position after the pressure in the receptacle is reduced, and being provided with a comparatively non-elastic sealing gasket located in the top of the closure so that when the closure is in place it forms a seal on the top of the mouth of the receptacle.

In testimony whereof, I have hereunto set my hand, in the presence of two subscribing witnesses.

HARVEY COALE.

Witnesses:
Howard D. Adams,
James Q. Rice.